United States Patent
Gigov et al.

(10) Patent No.: US 10,511,575 B2
(45) Date of Patent: Dec. 17, 2019

(54) SECURING DELEGATED CREDENTIALS IN THIRD-PARTY NETWORKS

(71) Applicant: Huawei Technologies Co., Ltd., Shenzhen (CN)

(72) Inventors: Nikolay Gigov, Waterloo (CA); Yin Tan, Waterloo (CA); Robert Lambert, Waterloo (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 15/707,528

(22) Filed: Sep. 18, 2017

(65) Prior Publication Data

US 2019/0089676 A1    Mar. 21, 2019

(51) Int. Cl.
    *H04L 29/06*    (2006.01)
(52) U.S. Cl.
    CPC ............ *H04L 63/029* (2013.01); *H04L 63/04* (2013.01)
(58) Field of Classification Search
    CPC ... H04L 63/029; H04L 63/04; H04L 63/0428; H04L 63/0807; H04L 63/0884; G06F 21/335
    See application file for complete search history.

(56) References Cited

U.S. PATENT DOCUMENTS

| | | | |
|---|---|---|---|
| 9,419,942 B1 * | 8/2016 | Buruganahalli | .... H04L 63/0227 |
| 2002/0176580 A1 * | 11/2002 | Horiuchi | ............. H04L 63/0442 380/270 |
| 2004/0015725 A1 * | 1/2004 | Boneh | .................... H04L 63/166 713/160 |
| 2005/0086505 A1 * | 4/2005 | Ishibashi | .......... G11B 20/00007 713/193 |
| 2012/0167194 A1 * | 6/2012 | Reese | ..................... G06F 21/31 726/9 |

(Continued)

FOREIGN PATENT DOCUMENTS

| | | |
|---|---|---|
| CN | 101039186 A | 9/2007 |
| CN | 101202760 A | 6/2008 |

(Continued)

OTHER PUBLICATIONS

Lu et al. A Proxy Agent for Small Network-Enabled Devices, Dec. 2008, IEEE International Performance, Computing and Communications Conference, pp. 445-449 (Year: 2008).*

*Primary Examiner* — Kenneth W Chang
(74) *Attorney, Agent, or Firm* — Slater Matsil, LLP

(57) ABSTRACT

Methods and systems for providing an endpoint device with access to a remote resource are disclosed. A first secure tunnel with the endpoint device is established from an intermediate device, the first tunnel terminating within a trusted execution environment (TEE) in the intermediate device. At least one credential is received within the TEE and via the first secure tunnel from the endpoint device. The at least one credential is transmitted from the intermediate device to the remote resource via a second secure tunnel, the second tunnel located between the remote resource and the intermediate device and originating within the TEE. In response to the at least one credential being accepted by the remote resource, communications between the endpoint device and the remote resource via the TEE in the intermediate device through the first and second secure tunnels are enabled.

20 Claims, 7 Drawing Sheets

(56) References Cited

U.S. PATENT DOCUMENTS

| | | | | |
|---|---|---|---|---|
| 2012/0265976 | A1* | 10/2012 | Spiers | H04L 63/0218 |
| | | | | 713/2 |
| 2014/0189808 | A1* | 7/2014 | Mahaffey | H04L 63/083 |
| | | | | 726/4 |
| 2014/0282981 | A1* | 9/2014 | Satpathy | H04L 63/083 |
| | | | | 726/8 |
| 2014/0317686 | A1* | 10/2014 | Vetillard | G06F 21/606 |
| | | | | 726/2 |
| 2016/0070932 | A1* | 3/2016 | Zimmer | G06F 21/72 |
| | | | | 713/192 |
| 2016/0119141 | A1 | 4/2016 | Jing et al. | |
| 2016/0134623 | A1* | 5/2016 | Roth | H04L 9/3268 |
| | | | | 713/156 |

FOREIGN PATENT DOCUMENTS

| | | |
|---|---|---|
| CN | 101447007 A | 6/2009 |
| CN | 101848207 A | 9/2010 |
| CN | 102571359 A | 7/2012 |
| CN | 104125216 A | 10/2014 |
| CN | 104158791 A | 11/2014 |
| CN | 105101169 A | 11/2015 |
| CN | 105429760 A | 3/2016 |

\* cited by examiner

SECURING DELEGATED CREDENTIALS IN THIRD-PARTY NETWORKS

TECHNICAL FIELD

The present disclosure relates generally to secured access to networks and information technology services, and more specifically to cloud-based secured access of networks and information technology services using credentials.

BACKGROUND OF THE ART

Credential-based access, typically using a combination of a username and a password, has a long history of use in secure access protocols. A user of an endpoint device seeking to access some remote resource provides credentials to an authentication server of the remote resource and, if accepted, is granted access to the remote resource. Increasingly, users are accessing remote resources through a third-party, and having the third-party make use of the remote resource on their behalf. For example, a user or an endpoint device may request that a third-party access an email server, and to do so the user device provides the third-party with the user's credentials.

However, in providing the third-party with their credentials via their endpoint device, the user now risks theft or exposure of their credentials. It is impossible for the user to know whether the third-party has deleted their credentials after using them to access the remote resource. If the third-party does not delete the user's credentials, then the third-party is a node at which the user's credentials may be acquired by a malicious actor, or may be exposed following a breach.

Therefore, there is room for improved techniques for delegating credentials to third-parties.

SUMMARY

In accordance with a broad aspect, there is provided a method for providing an endpoint device with access to a remote resource, comprising: establishing, from an intermediate device, a first secure tunnel with the endpoint device, the first tunnel terminating within a trusted execution environment (TEE) in the intermediate device; receiving, within the TEE and via the first secure tunnel, at least one credential from the endpoint device; transmitting the at least one credential from the intermediate device to the remote resource via a second secure tunnel, the second secure tunnel located between the remote resource and the intermediate device and originating within the TEE; and in response to the at least one credential being accepted by the remote resource, enabling communications between the endpoint device and the remote resource via the TEE in the intermediate device through the first and second secure tunnels.

In some embodiments, the method further comprises receiving, at the intermediate device, a request to access the remote resource from the endpoint device prior to establishing the first secure tunnel, and establishing the first secure tunnel in response to the request.

In some embodiments, the method further comprises constructing the TEE within the intermediate device in response to receiving the request.

In some embodiments, the method further comprises establishing the second secure tunnel in response to the request to access the remote resource.

In some embodiments, the method further comprises storing the at least one credential within the TEE.

In some embodiments, the method further comprises: receiving, at the intermediate device, a request from the endpoint device to terminate access to the remote resource; deleting the at least one credential from the TEE; and terminating at least one of the first secure tunnel and the second secure tunnel.

In some embodiments, enabling communication between the endpoint device and the remote resource comprises: receiving, at the intermediate device, plaintext data from the endpoint device within the TEE; encrypting the plaintext data with a data encryption key within the TEE to produce encrypted data; and transmitting the encrypted data to the remote resource via the second secure tunnel.

In some embodiments, the method further comprises deleting the plaintext data from the TEE after encrypting the plaintext data.

In some embodiments, the method further comprises instructing the endpoint device to delete the plaintext data from the endpoint device after transmitting the encrypted data to the remote resource.

In some embodiments, establishing the first secure tunnel with the endpoint device comprises establishing a transport-layer security connection between the endpoint device and the TEE.

In accordance with another broad aspect, there is provided a system for providing an endpoint device with access to a remote resource, comprising a processing unit; and a non-transitory computer-readable memory communicatively coupled to the processing unit. The computer-readable memory comprises computer-readable program instructions executable by the processing unit for: establishing, from an intermediate device, a first secure tunnel with the endpoint device, the first tunnel terminating within a trusted execution environment in the intermediate device; receiving, within the TEE and via the first secure tunnel, at least one credential from the endpoint device; transmitting the at least one credential from the intermediate device to the remote resource via a second secure tunnel, the second secure tunnel located between the remote resource and the intermediate device and originating within the TEE; and in response to the at least one credential being accepted by the remote resource, enabling communications between the endpoint device and the remote resource via the TEE in the intermediate device through the first and second secure tunnels.

In some embodiments, the program instructions are further executable by the processing unit for receiving, at the intermediate device, a request to access the remote resource from the endpoint device prior to establishing the first secure tunnel, and establishing the first secure tunnel in response to the request.

In some embodiments, the program instructions are further executable by the processing unit for constructing the TEE within the intermediate device in response to receiving the request.

In some embodiments, the program instructions are further executable by the processing unit for establishing the second secure tunnel in response to the request to access the remote resource.

In some embodiments, the program instructions are further executable by the processing unit for storing the at least one credential within the TEE.

In some embodiments, the program instructions are further executable by the processing unit for: receiving, at the intermediate device, a request from the endpoint device to terminate access to the remote resource; deleting the at least one credential from the TEE; and terminating at least one of the first secure tunnel and the second secure tunnel.

In some embodiments, enabling communication between the endpoint device and the remote resource comprises: receiving, at the intermediate device, plaintext data from the endpoint device within the TEE; encrypting the plaintext data with a data encryption key within the TEE to produce encrypted data; and transmitting the encrypted data to the remote resource via the second secure tunnel.

In some embodiments, the program instructions are further executable by the processing unit for deleting the plaintext data from the TEE after encrypting the plaintext data.

In some embodiments, the program instructions are further executable by the processing unit for instructing the endpoint device to delete the plaintext data from the endpoint device after transmitting the encrypted data to the remote resource.

In some embodiments, establishing the first secure tunnel with the endpoint device comprises establishing a transport-layer security connection between the endpoint device and the TEE.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
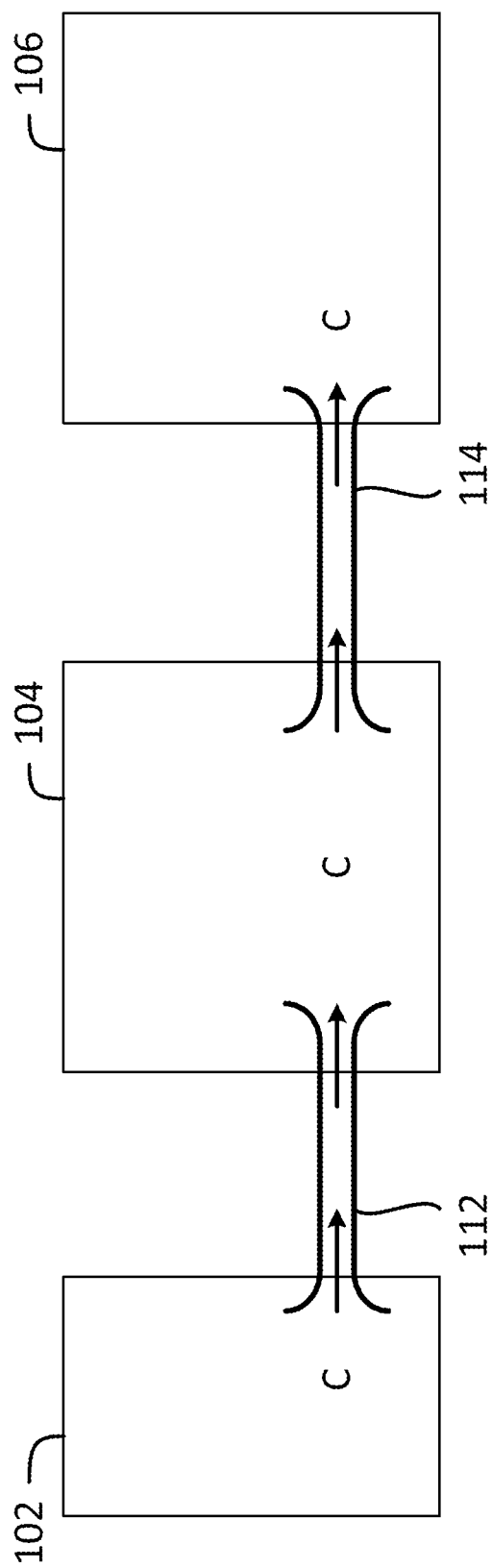
FIG. 1 is a diagram of an example prior art credential delegation system.

With reference to FIG. 1, in prior art systems, an endpoint device 102 requests a third-party device 104 to access a remote resource 106 and to perform one or more actions at the remote resource 106 on behalf of the endpoint device 102. For example, the third-party device 104 is an identity access manager, which implements a single sign-on service. The endpoint device 102 is a laptop or desktop computer, a smartphone or other mobile device, or any other suitable communication device. The third-party device 104 is a cloud-based server or any other suitable type of server, and the remote resource 106 is an email server, a media repository, a social-media site, or any other suitable resource. The endpoint device 102 sends the third-party server 104 a credential C via a communication path 112, and the third-party server 104 uses the credential C to access the remote resource 106. This approach, however, means that the credential C resides at the third-party device 104 and is at risk of being exposed or stolen by a malicious actor.

Figure 2:
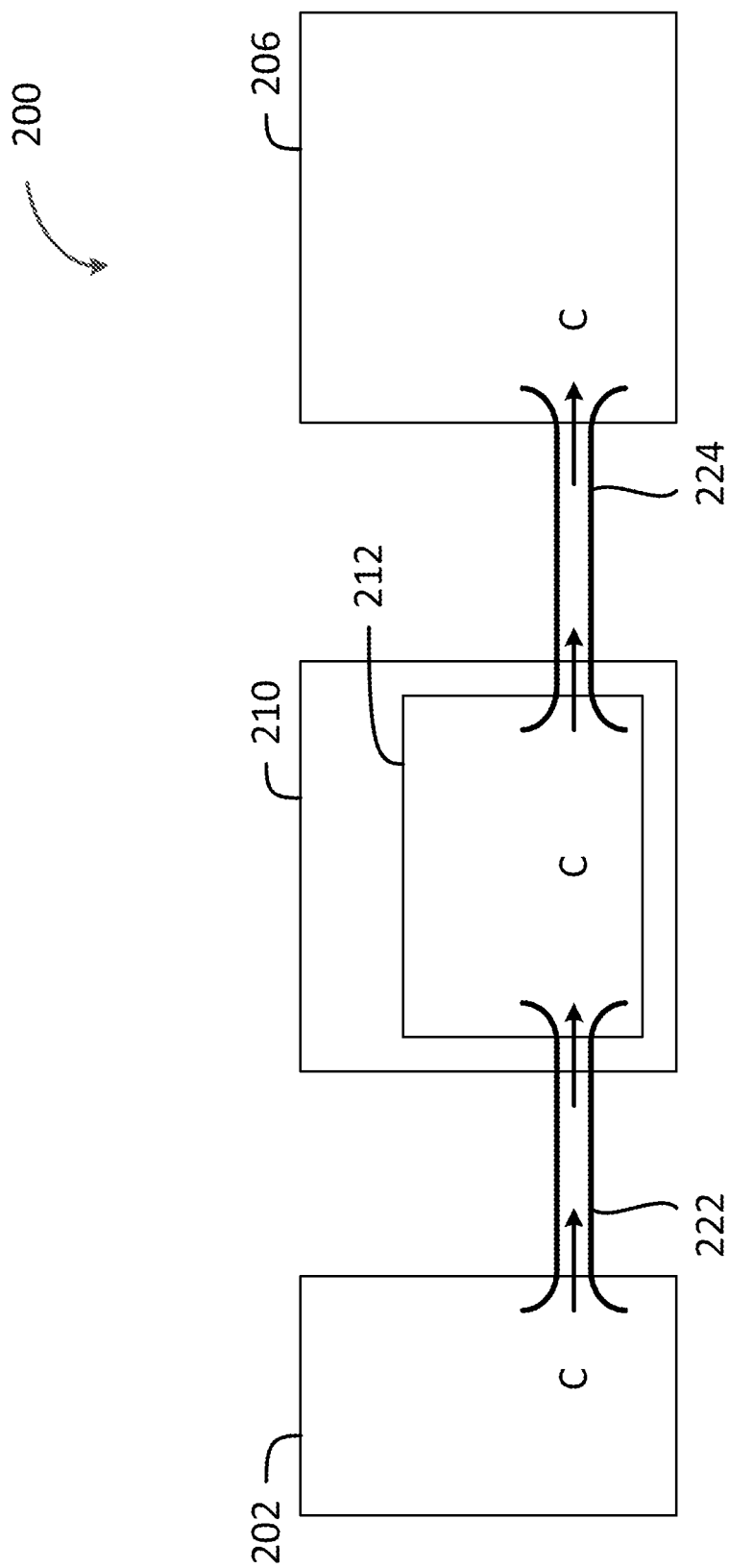
FIG. 2 is a block diagram of an example credential delegation system.

With reference to FIG. 2, a network 200 is illustrated, including an endpoint device 202, a remote resource 206, and an intermediate device 210. The intermediate device 210 serves as an intermediary and provides the endpoint device 202 with access to the remote resource 206. The endpoint device 202 is substantially similar to the endpoint device 102, and the remote resource is substantially similar to the remote resource 106.

The intermediate device 210, which can be a cloud server or any other suitable server, is configured for implementing a trusted execution environment (TEE) 212. The TEE 212 is any suitable kind of trusted execution environment, for example as provided by Intel™ SGX™ technology. In other embodiments, other types of trusted execution environments, for example Trusted Platform Module™ or TrustZone™, are used. The TEE 212 operates by performing processor-based encryption on all computer-readable instructions and data used by the execution of the instructions. In this fashion, the instructions and data used within the TEE 212 are encrypted and inscrutable to the intermediate device 210 itself, and to any person having access to the intermediate device 210.

Communications between the endpoint device 202 and the intermediate device 210 are exchanged over a secure tunnel 222, and communications between the intermediate device 210 and the remote resource 206 are exchanged over a secure tunnel 224. Both secure tunnels 222 and 224 are established with an end-point within the TEE 212 at the intermediate device 210. For example, the secure tunnel 222 originates at the endpoint device 202 and terminates within the TEE 212, and the secure tunnel 224 originates within the TEE 212 and terminates at the remote resource 206. It should be noted that in some embodiments, the directionality of the secure tunnels 222 and 224 is reversed. In other embodiments, the secure tunnels 222 and 224 are direction-agnostic.

In some embodiments, the first and second secure tunnels 222 and 224 are transport layer security (TLS) connections which are terminated within the TEE 212. TLS certificates, including private keys associated with the secure tunnels 222 and 224, and session keys are kept within the TEE 212. In some embodiments, the TEE 212 also stores a tunnel key associated with the secure tunnel 222 and/or the secure tunnel 224. In some embodiments, the endpoint device 202, remote resource 206, and/or the intermediate device 210 perform one or more additional security verifications, for example to ensure that the secure tunnels 222 and 224 are terminated within the TEE 212. For example, the endpoint device 202 and/or the remote resource 206 can use one or more remote attestation techniques to verify the authenticity of the TEE 212 at the intermediary node 210. For instance, the remote attestation techniques are used to verify an identity or other identification information associated with the TEE 212, to confirm that the TEE 212 is trustworthy for the purposes of the endpoint device 202 and/or the remote resource 206.

Figure 3A:
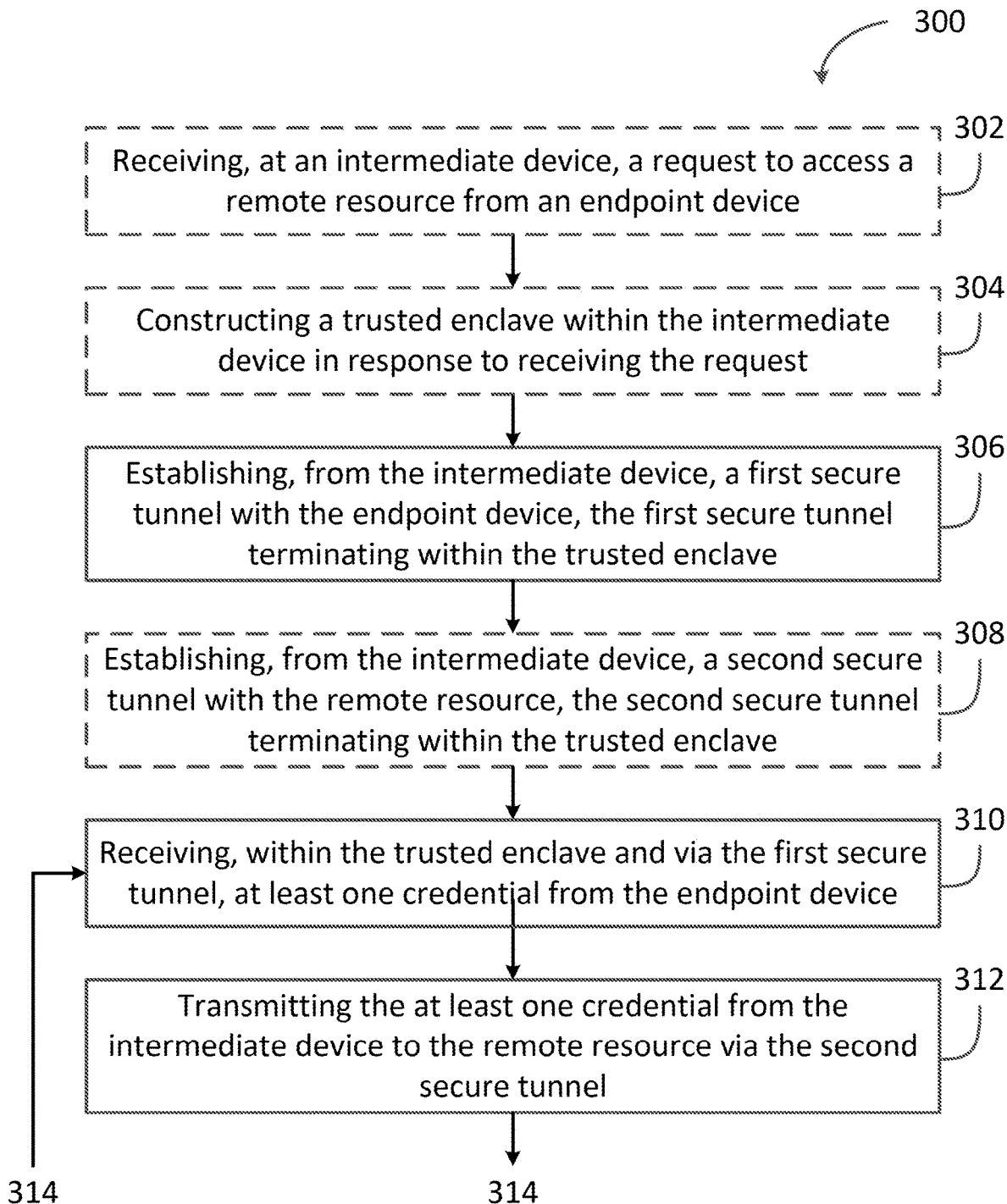
FIGS. 3A-B are a flowchart illustrating an example method for providing an endpoint device with access to a remote resource.
Figure 3B:
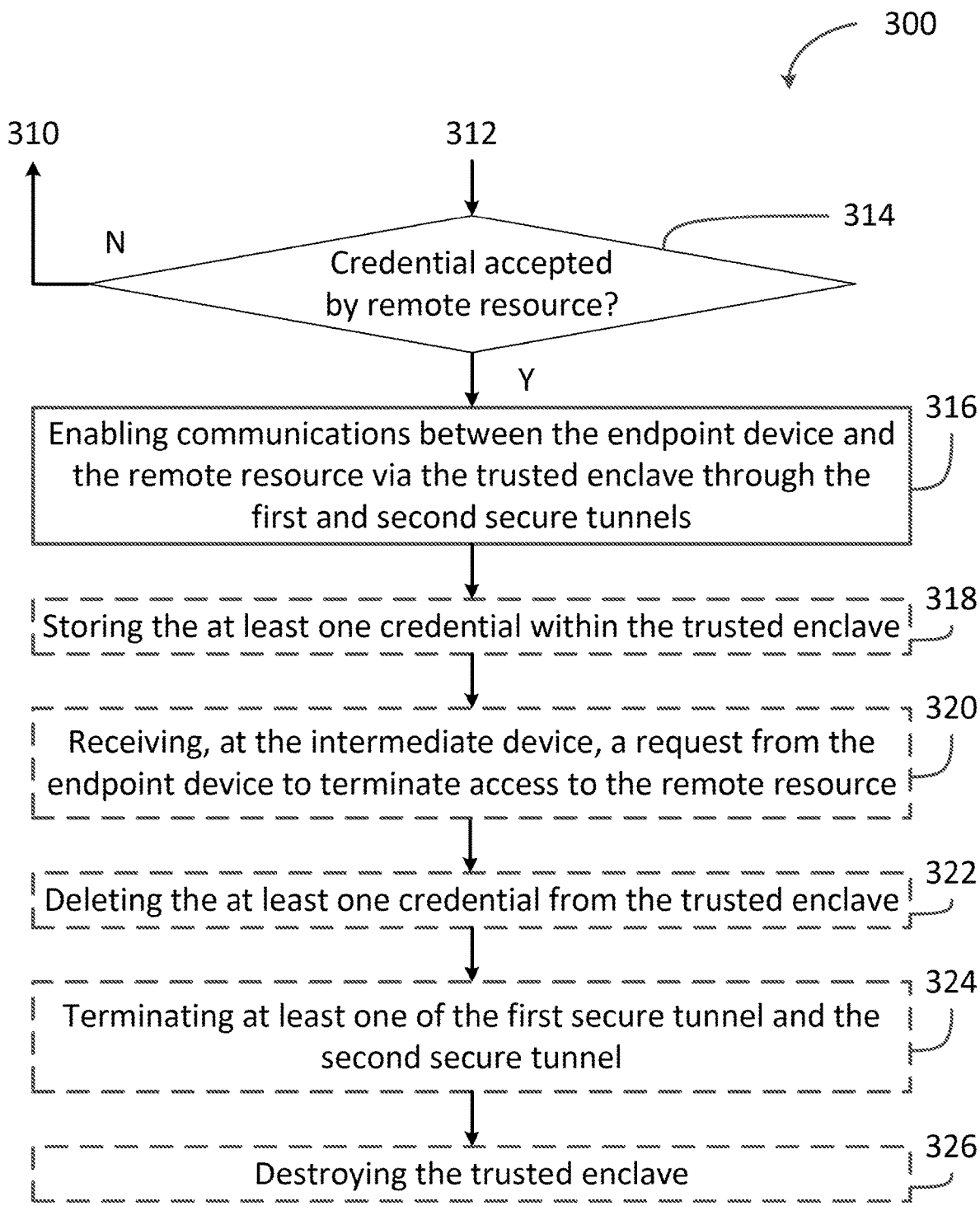

With reference to FIGS. 3A-B, a method 300 for providing the endpoint device 202 with access to the remote resource 206 is illustrated. At step 302, optionally the intermediate device 210 receives a request to access the remote resource 206 from the endpoint device 202. In some embodiments, the request is sent over a secured communication path. In other embodiments, the request is sent over an unsecured communication path. The request is sent using any suitable communications protocol. In some embodiments, the request specifies the remote resource 206 which the endpoint device 202 wishes to access. In other embodiments, the request indicates that the endpoint device 202 wishes to access one of a plurality of remote resources, including the remote resource 206, and a later request is received at the intermediate device to specify the remote resource 206. In still further embodiments, the intermediate device 210 is configured for periodically performing one or more actions on behalf of the endpoint device 202 according to a predetermined schedule. In embodiments in which the method 300 is performed according to the predetermined schedule, step 302 is omitted.

At step 304, optionally the TEE 212 is constructed within the intermediate device 210 in response to receiving the request. The TEE 212 is constructed by way of one or more API calls or other suitable instructions performed by the intermediate device 210. In some embodiments, the TEE 212 is a trusted execution environment constructed using Intel™ SGX™ technology. In other embodiments, the TEE 212 has been previously constructed, and step 304 is omitted.

At step 306, the first secure tunnel 222 is established with the endpoint device 202. The first secure tunnel 222 is established from the intermediate device 210 and terminates within the TEE 212. In some embodiments, the first secure tunnel 222 is a transport layer security (TLS) connection which is terminated within the TEE 212. TLS certificates, including private keys associated with the first secure tunnel 222, and session keys are kept within the TEE 212. In some embodiments, the TEE 212 also stores a tunnel key associated with the secure tunnel 222, and additional tunnel keys for any subsequent tunnels. In some embodiments, the endpoint device 202 and/or the intermediate device 210 perform one or more additional security verifications, for example to ensure that the first secure tunnel 222 is terminated within the TEE 212. For instance, one or more remote attestation techniques are used. In other embodiments, other network protocols are used to establish the first secure tunnel 222.

At step 308, optionally the second secure tunnel 224 is established with the remote resource 206. The second secure tunnel 224 is established from the intermediate device 210 and terminates within the TEE 212. In some embodiments, the second secure tunnel 224 is established in similar fashion as the first secure tunnel 222; alternatively, the second secure tunnel is established using other techniques. In other embodiments, the second secure tunnel 224 has been previously established, and step 308 is omitted.

At step 310, at least one credential C is received from the endpoint device 202 within the TEE 212 and via the first secure tunnel 222. The credential C is received in any suitable way, using any suitable communications protocols. The credential C may include one or more usernames, one or more passwords, any suitable combination thereof, including hashes, authentication tokens, and convolutions, and any other suitable information. Because the credential C is received within the TEE 212, it remains inscrutable to the intermediate device 210 and cannot be obtained therefrom other than within the TEE 212.

At step 312, the credential C is transmitted from the intermediate device to the remote resource 206 via the second secure tunnel 224. The credential C is transmitted in any suitable way, using any suitable communications protocols. It should be noted that the credential C is located within the TEE 212, and is transmitted from the TEE 212 to the remote resource 206.

At decision step 314, a determination is made regarding whether the credential C is accepted by the remote resource 206. In some embodiments, the remote resource 206 communicates to the intermediate device 210 and/or the TEE 212 an indication of whether the credential C is accepted by the remote resource 206. In other embodiments, the remote resource 206 communicates to the intermediate device 210 and/or the TEE 212 an acknowledgement when the credential C is accepted by the remote resource 206, and does not communicate when the credential C is not accepted. When the credential C is accepted, the method 300 proceeds to step 316. When the credential C is not accepted, the method 300 returns to some previous step, for example to step 310. In some embodiments, when the credential C is not accepted, the intermediate device 210 and/or the TEE 212 sends to the endpoint device 202 an indication that the credential C was not accepted by the remote resource 206.

At step 316, in response to the at least one credential being accepted by the remote resource, communications between the endpoint device 202 and the remote resource 206 are enabled via the TEE 212 through the first and second secure tunnels 222 and 224. In some embodiments, the TEE 212 acts as a conduit for communications between the endpoint device 202 and the remote resource 206. In other embodiments, the request received at step 302 includes one or more actions which were requested to be performed by the intermediate device 210 on behalf of the endpoint device 202. The intermediate device 210, by way of the TEE 212, communicates with the remote resource 206 to cause the actions to be performed at the remote resource 206. In some embodiments, the list of possible actions to be performed by the intermediate device 210 is limited by the TEE 212. For example, the automatic integrity checking performed by the TEE 212 limits the list of possible actions to be performed by the intermediate device 210. This prevents a malicious device or client from injecting bad requests and/or a malicious administrator of the intermediate device 210 from modifying requests sent to the intermediate device 210.

Optionally, at step 318, the credential C is stored within the TEE 212. In some embodiments, the TEE 212 is substantially permanent within the intermediate device 210. Once the endpoint device 202 provides the TEE 212 with the credential C, the credential C is stored therein to avoid having to provide the credential C again. The credential C is stored in any suitable fashion, for instance in any suitably encrypted form, and in some embodiments is encoded using any suitable techniques.

Optionally, at step 320, a request is received at the intermediate device 210 from the endpoint device 202 to terminate access to the remote resource 206. In some embodiments, the request is received at the TEE 212 of the intermediate device 210. In some embodiments, the request is received over the secure tunnel 222; alternatively the request is received over another encrypted or otherwise secure communication path, as appropriate. The request is received in any suitable way, using any suitable communications protocols. In some embodiments, the request includes additional information, for example instructions to delete one or more credentials, for instance the credential C, instructions to terminate the TEE 212, and the like. Depending on the nature of the request received at step 320, any one or more of steps 322, 324, and 326 is performed.

In some embodiments, at step 322, the credential C is deleted from the TEE 212. In some other embodiments, at step 324, at least one of the first secure tunnel 222 and the second secure tunnel 224 is terminated. In still further embodiments, at step 326, the TEE is destroyed. In some embodiments, one or more of steps 322, 324, and 326 are performed substantially simultaneously by the intermediate device 210.

In some embodiments, any one or more of steps 322, 324, and 326 is performed following a timeout period during which no communications are exchanged between the endpoint device 202 and the remote resource 206. For example, after a timeout period step 324 is performed and the second secure tunnel is terminated. In the event that a communication from the endpoint device 202 destined for the remote resource is received after the timeout period, step 308 is performed to re-establish the second secure tunnel.

It should be noted that in some embodiments, various steps of the method 300 are performed substantially concurrently. For example, steps 306 and 308 are performed concurrently after receiving the request to access the remote resource 206. In another example, steps 322, 324, and 326 are performed concurrently after receiving the request to terminate access to the remote resource 206. In addition, in some embodiments the order in which steps are illustrated in FIGS. 3A and 3B is varied. For instance, step 308 is performed before step 306, and the order of steps 322, 324, and 326 is altered.

By ensuring that access to remote resource 206 for the endpoint device 202 is brokered through the TEE 212, exposure of credentials, including the credential C, can be limited or prevented, thereby improving the security of accessing the remote resource 206.

Figure 4:
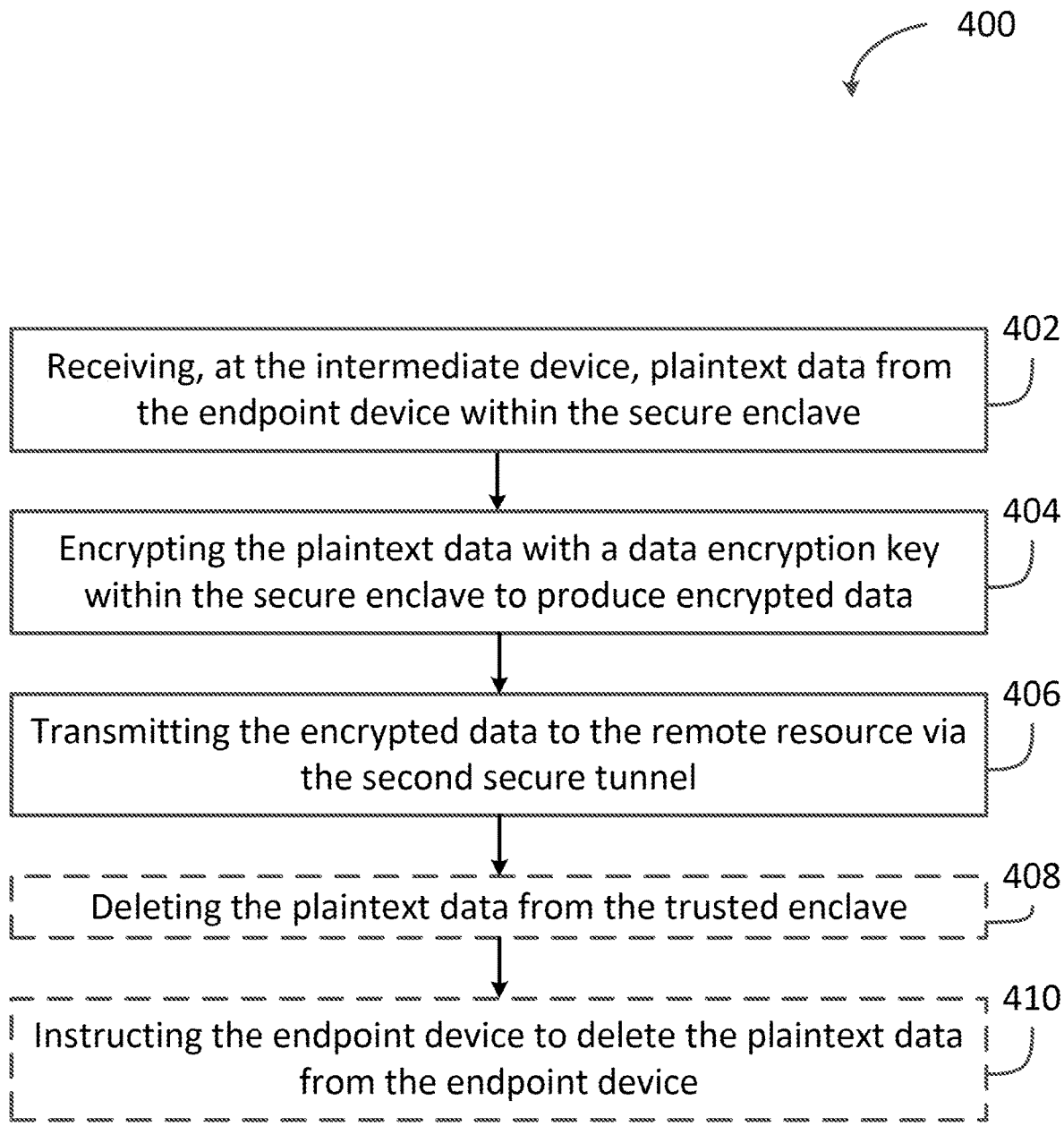
FIG. 4 is a flowchart illustrating an example method for performing third-party encryption.

With reference to FIG. 4, the TEE 212 is used to enable communications between the endpoint device 202 and the remote resource 206 through the first and second secure tunnels 222 and 224. In some embodiments, this includes performing the method 400. At step 402, plaintext data is received from the endpoint device 202 at the intermediate device 210, within the TEE. The plaintext data is received over the first secure tunnel 222. The plaintext data is text, photos, video, other media, or any other suitable type of data that is considered to be unencrypted. In some cases, the plaintext data also includes previously-encrypted data that a user of the endpoint device 202 wishes to further encrypt.

At step 404, the plaintext data is encrypted with a data encryption key within the TEE 212 to produce encrypted data. The encryption process performed by the intermediate device 210 within the TEE 212 uses any suitable ciphering techniques, and any suitable level of encryption. Because the plaintext data is only ever received within the TEE 212, and because the encryption process takes place within the TEE 212, the plaintext data and the encryption steps are inscrutable to intermediate device 210, or to any malicious actor having access to the intermediate device 210.

At step 406, the encrypted data is transmitted to the remote resource 206 via the second secure tunnel 224. In some embodiments, the encrypted data is transmitted to the remote resource 206 for storage. The encrypted data is transmitted in any suitable way, using any suitable communications protocols. In some embodiments, the data encryption key is transmitted alongside the encrypted data. For example, the data encryption key is wrapped with, or alongside, the encrypted data.

Optionally, at step 408, the plaintext data is deleted from the TEE 212. Deleting the plaintext data from the TEE 212 ensures that even in the unlikely event that the processor-based encryption of the TEE 212 is breached, a malicious actor will not have access to the plaintext data. In some embodiments, step 408 also includes deleting the encrypted data from the TEE 212.

Optionally, at step 410, the endpoint device 202 is instructed to delete the plaintext data from the endpoint device 202. In some embodiments, the intermediate device 210, for example via the TEE 212, sends instructions to the endpoint device 202 to cause the endpoint device 202 to delete the plaintext data. Because the plaintext data is retrievable from the encrypted data stored on the remote resource 206, the user of the endpoint device 202 is able to retrieve the plaintext data even after the plaintext data is deleted from the endpoint device 202. In addition, deleting the plaintext data from the endpoint device 202 ensures that if the endpoint device 202 becomes compromised, for example is stolen by a malicious actor, the malicious actor cannot acquire the plaintext data.

Figure 5:
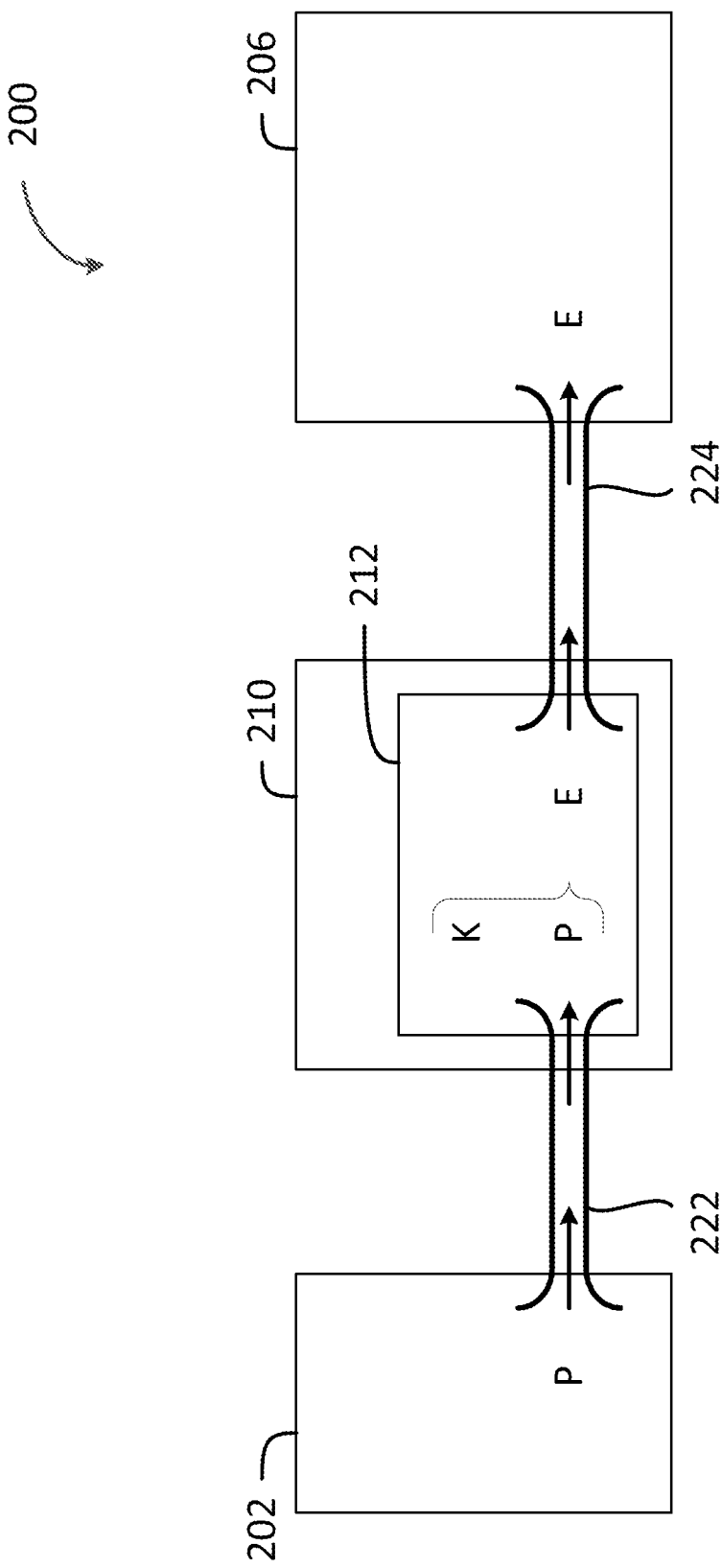
FIG. 5 is a block diagram of an example third-party encryption system.

With reference to FIG. 5, a graphical representation of the method 400 is illustrated. Plaintext data P is received at the intermediate device 210 via the first secure tunnel 222 and within the TEE 212, as per step 402. The data encryption key K is used to encrypt the plaintext data P to produce encrypted data E, as per step 404. The encrypted data E is transmitted to the remote resource 206 via the second secure tunnel 224, as per step 406. Thereafter, in some embodiments the plaintext data P and/or the encrypted data E is deleted from the endpoint device 202 and/or from the intermediate device 210, as appropriate, as per steps 408 and 410.

In some embodiments, the intermediate device 210 and the TEE 212 are used to perform remote encryption of data, thereby offloading computationally-intensive calculations from the endpoint device 202. This helps reduce energy requirements for the endpoint device 202, which may be particularly helpful if the endpoint device 202 is a smartphone or other battery-powered device. In addition, the use of the TEE 212 ensures that malicious actors having access to the intermediate device 210 cannot acquire the plaintext data P, the encrypted data E, or the data encryption key K.

In some embodiments, the TEE 212 is configured for logging usage of the TEE 212, including one or more of access timestamps, access locations and/or IP addresses, and types of actions performed via the TEE 212. For example, the TEE 212 flags suspicious use of particular credentials, or too-frequent access of the TEE 212 from a particular location. In some embodiments, the TEE 212 and/or the intermediate device 210 are configured for providing the endpoint device 202 and/or a network administrator or other responsible entity with an indication that suspicious activity has been flagged.

Figure 6:
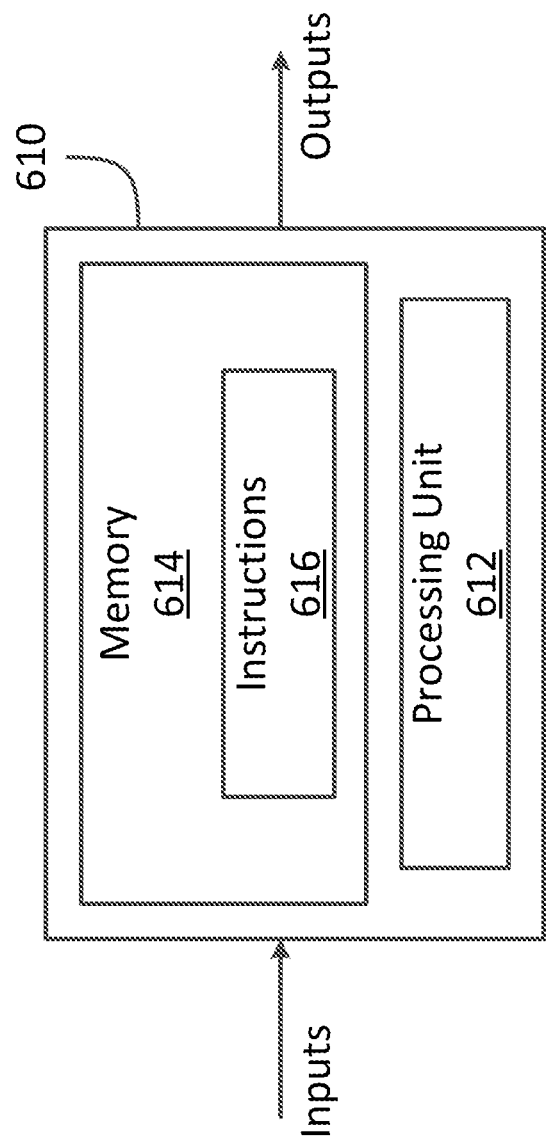
FIG. 6 is a block diagram of an example computer system for implementing the methods of FIGS. 2A-B and 4.

With reference to FIG. 6, the methods 200 and 400 may be implemented by a computing device 610, comprising a processing unit 612 and a memory 614 which has stored therein computer-executable instructions 616. The processing unit 612 may be any suitable device configured to implement the methods 200 and 400 such that instructions 616, when executed by the computing device 610 or other programmable apparatus, causes the functions/acts/steps performed as part of the methods 200 and 400 as described herein to be executed. The processing unit 612 may be, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof. The processing unit 612 is configured to encrypt any suitable regions of the memory 614, including those portions of the memory used to implement the TEE 212. The processing unit 612 is also configured for providing measurements and/or guarantees relating to the validity, authenticity, and integrity of computer-executable instructions 616 being executed in the TEE 212.

The memory 614 may be any suitable known or other machine-readable storage medium. The memory 614 may be non-transitory computer readable storage medium, for example, but not limited to, an electronic, magnetic, optical, electromagnetic, infrared, or semiconductor system, apparatus, or device, or any suitable combination of the foregoing. The memory 614 includes a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may be any storage means (e.g., devices) suitable for retrievably storing machine-readable instructions 616 executable by processing unit 612.

The methods and systems for providing an endpoint device with access to a remote resource described herein may be implemented in a high level procedural or object oriented programming or scripting language, or a combination thereof, to communicate with or assist in the operation of a computer system, for example the computing device 610. Alternatively, the methods and systems for providing an endpoint device with access to a remote resource may be implemented in assembly or machine language. The language may be a compiled or interpreted language. Program code for implementing the methods and systems for providing an endpoint device with access to a remote resource may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for providing an endpoint device with access to a remote resource may also be considered to be implemented by way of a non-transitory computer-readable storage medium having a computer program stored thereon. The computer program may comprise computer-readable instructions which cause a computer, or more specifically the processing unit 612 of the computing device 310, to operate in a specific and predefined manner to perform the functions described herein, for example those described in the methods 200 and 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for providing an endpoint device with access to a remote resource may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for providing an endpoint device with access to a remote resource, comprising:
    establishing, from an intermediate device, a first secure tunnel with the endpoint device, the first secure tunnel terminating within a trusted execution environment (TEE) in a processing unit of the intermediate device, wherein the TEE performs processor-based encryption on instructions and on data used by the instructions during execution of the instructions;
    receiving, within the TEE and via the first secure tunnel, at least one credential from the endpoint device;
    transmitting the at least one credential from the intermediate device to the remote resource via a second secure tunnel, the second secure tunnel between the remote resource and the intermediate device and originating within the TEE; and
    in response to the at least one credential being accepted by the remote resource, enabling communications between the endpoint device and the remote resource via the TEE in the intermediate device through the first and second secure tunnels.

2. The method of claim 1, further comprising receiving, at the intermediate device, a request to access the remote resource from the endpoint device prior to establishing the first secure tunnel, and establishing the first secure tunnel in response to the request.

3. The method of claim 2, further comprising constructing the TEE within the intermediate device in response to receiving the request.

4. The method of claim 2, further comprising establishing the second secure tunnel in response to the request to access the remote resource.

5. The method of claim 1, further comprising storing the at least one credential within the TEE.

6. The method of claim 1, further comprising:
    receiving, at the intermediate device, a request from the endpoint device to terminate the access to the remote resource;
    deleting the at least one credential from the TEE; and
    terminating at least one of the first secure tunnel and the second secure tunnel.

7. The method of claim 1, wherein the enabling the communications between the endpoint device and the remote resource comprises:
    receiving, at the intermediate device, plaintext data from the endpoint device within the TEE;
    encrypting the plaintext data with a data encryption key within the TEE to produce encrypted data; and
    transmitting the encrypted data to the remote resource via the second secure tunnel.

8. The method of claim 7, further comprising deleting the plaintext data from the TEE after encrypting the plaintext data.

9. The method of claim 7, further comprising instructing the endpoint device to delete the plaintext data from the endpoint device after the transmitting the encrypted data to the remote resource.

10. The method of claim 1, wherein establishing the first secure tunnel with the endpoint device comprises establishing a transport-layer security connection between the endpoint device and the TEE.

11. An intermediate device for providing an endpoint device with access to a remote resource, comprising:
- a processing unit comprising a trusted execution environment (TEE); and
- a non-transitory computer-readable memory communicatively coupled to the processing unit and comprising computer-readable program instructions executable by the processing unit for:
  - establishing, from the intermediate device, a first secure tunnel with the endpoint device, the first secure tunnel terminating within the TEE, wherein the TEE performs processor-based encryption on instructions and on data used by the instructions during execution of the instructions;
  - receiving, within the TEE and via the first secure tunnel, at least one credential from the endpoint device;
  - transmitting the at least one credential from the intermediate device to the remote resource via a second secure tunnel, the second secure tunnel between the remote resource and the intermediate device and originating within the TEE; and
  - in response to the at least one credential being accepted by the remote resource, enabling communications between the endpoint device and the remote resource via the TEE in the intermediate device through the first and second secure tunnels.

12. The intermediate device of claim 11, wherein the computer-readable program instructions are further executable by the processing unit for receiving, at the intermediate device, a request to access the remote resource from the endpoint device prior to establishing the first secure tunnel, and establishing the first secure tunnel in response to the request.

13. The intermediate device of claim 12, wherein the computer-readable program instructions are further executable by the processing unit for constructing the TEE within the intermediate device in response to receiving the request.

14. The intermediate device of claim 12, wherein the computer-readable program instructions are further executable by the processing unit for establishing the second secure tunnel in response to the request to access the remote resource.

15. The intermediate device of claim 11, wherein the computer-readable program instructions are further executable by the processing unit for storing the at least one credential within the TEE.

16. The intermediate device of claim 11, wherein the computer-readable program instructions are further executable by the processing unit for:
- receiving, at the intermediate device, a request from the endpoint device to terminate the access to the remote resource;
- deleting the at least one credential from the TEE; and
- terminating at least one of the first secure tunnel and the second secure tunnel.

17. The intermediate device of claim 11, wherein the enabling the communications between the endpoint device and the remote resource comprises:
- receiving, at the intermediate device, plaintext data from the endpoint device within the TEE;
- encrypting the plaintext data with a data encryption key within the TEE to produce encrypted data; and
- transmitting the encrypted data to the remote resource via the second secure tunnel.

18. The intermediate device of claim 17, wherein the computer-readable program instructions are further executable by the processing unit for deleting the plaintext data from the TEE after encrypting the plaintext data.

19. The intermediate device of claim 17, wherein the computer-readable program instructions are further executable by the processing unit for instructing the endpoint device to delete the plaintext data from the endpoint device after the transmitting the encrypted data to the remote resource.

20. The intermediate device of claim 11, wherein establishing the first secure tunnel with the endpoint device comprises establishing a transport-layer security connection between the endpoint device and the TEE.

* * * * *